US010913174B2

(12) United States Patent
Nakashima

(10) Patent No.: US 10,913,174 B2
(45) Date of Patent: Feb. 9, 2021

(54) PORTABLE CUTTING DEVICE

(71) Applicant: MAKITA CORPORATION, Anjo (JP)

(72) Inventor: Tatsuo Nakashima, Anjo (JP)

(73) Assignee: MAKITA CORPORATION, Anjo (JP)

( * ) Notice: Subject to any disclaimer, the term of this patent is extended or adjusted under 35 U.S.C. 154(b) by 29 days.

(21) Appl. No.: 16/176,957

(22) Filed: Oct. 31, 2018

(65) Prior Publication Data

US 2019/0143555 A1    May 16, 2019

(30) Foreign Application Priority Data

Nov. 14, 2017   (JP) ................................. 2017-218817

(51) Int. Cl.
| | | |
|---|---|---|
| *B23D 45/16* | (2006.01) | |
| *B27B 9/02* | (2006.01) | |
| *B23D 47/12* | (2006.01) | |
| *B25F 5/02* | (2006.01) | |
| *B26B 25/00* | (2006.01) | |
| *B23Q 11/06* | (2006.01) | |

(52) U.S. Cl.
CPC ................ *B27B 9/02* (2013.01); *B23D 45/16* (2013.01); *B23D 47/12* (2013.01); *B23Q 11/06* (2013.01); *B25F 5/02* (2013.01); *B26B 25/00* (2013.01)

(58) Field of Classification Search
CPC ................................. B26B 25/00; B23D 45/16
See application file for complete search history.

(56) References Cited

U.S. PATENT DOCUMENTS

| | | |
|---|---|---|
| 8,935,857 B2 | 1/2015 | Inayoshi |
| 9,287,751 B2 | 3/2016 | Naito et al. |
| 9,364,906 B2 | 6/2016 | Abe et al. |
| 2014/0215839 A1* | 8/2014 | Abe ....................... B25F 5/001 30/388 |
| 2015/0026985 A1 | 1/2015 | Yamaguchi et al. |
| 2015/0266201 A1 | 9/2015 | Nakashima |
| 2015/0326098 A1 | 11/2015 | Hirata |
| 2015/0328796 A1 | 11/2015 | Okouchi et al. |
| 2016/0176064 A1 | 6/2016 | Okouchi et al. |
| 2016/0193673 A1* | 7/2016 | Yoshida ................. B23D 47/12 30/388 |
| 2017/0021466 A1 | 1/2017 | Hiroshima et al. |
| 2017/0326660 A1* | 11/2017 | Nakashima ............... B27B 9/04 |
| 2018/0021865 A1 | 1/2018 | Yamaguchi et al. |
| 2018/0290221 A1* | 10/2018 | Ogino .................... B23D 45/16 |
| 2019/0077004 A1* | 3/2019 | Numata .................. B25F 5/008 |

(Continued)

FOREIGN PATENT DOCUMENTS

| | | |
|---|---|---|
| CN | 204381534 U | 6/2015 |
| CN | 105082085 A | 11/2015 |
| CN | 204868108 U | 12/2015 |

(Continued)

OTHER PUBLICATIONS

Oct. 10, 2020 Office Action issued in Chinese Patent Application No. 2018111900081.0.

*Primary Examiner* — Kenneth E Peterson
(74) *Attorney, Agent, or Firm* — Oliff PLC

(57) ABSTRACT

A controller 50 is disposed to the front relative to a rotation shaft 11*d* of an electric motor 11 above a base 2, so as to be tilted in the up-to-down direction as it extends frontward.

15 Claims, 9 Drawing Sheets

(56) References Cited

U.S. PATENT DOCUMENTS

2019/0131899 A1* 5/2019 Kuragano .......... H02K 11/0094
2019/0388983 A1* 12/2019 Numata ................. B23D 45/16

FOREIGN PATENT DOCUMENTS

| | | |
|---|---|---|
| EP | 2712712 B1 | 4/2017 |
| JP | 2011-183466 A | 9/2011 |
| JP | 2013-193133 A | 9/2013 |
| JP | 2014-79873 A | 5/2014 |
| JP | 2014-148015 A | 8/2014 |
| JP | 2015-20257 A | 2/2015 |
| JP | 2015-112652 A | 6/2015 |
| JP | 2015-178226 A | 10/2015 |
| JP | 2017-24115 A | 2/2017 |
| WO | 2012007936 A1 | 1/2012 |

* cited by examiner

PORTABLE CUTTING DEVICE

CROSS-REFERENCE

This application claims priority to Japanese patent application serial number 2017-218817, filed on Nov. 14, 2017, the contents of which are incorporated herein by reference in their entirety.

TECHNICAL FIELD

The present invention generally relates to a portable cutting device that is operated by a user while holding the device, such as, for example, a portable circular saw or a portable jig saw.

BACKGROUND ART

Various portable circular saws are disclosed in, for example, Japanese Laid-Open Patent Publication No. 2015-112652 (hereinafter referred to as "patent document 1"), Japanese Laid-Open Patent Publication No. 2014-79873 (hereinafter referred to as "patent document 2"), Japanese Laid-Open Patent Publication No. 2015-178226 (hereinafter referred to as "patent document 3"), and Japanese Laid-Open Patent Publication No. 2013-193133 (hereinafter referred to as "patent document 4"). Generally, the disclosed portable circular saws in the above documents comprise an electric motor including a rotation shaft, a saw blade that is driven by the electric motor, a controller that controls the electric motor, and a base that supports a cutting device main body including the electric motor and the controller. The portable circular saw is configured such that a workpiece (a material to be cut) is cut by the saw blade when the base of said saw is placed on the workpiece, and is moved in the forward direction with respect to the workpiece. The controller is formed, for example, in a box shape having a shortest side where the wide surface of the controller intersects the shortest side.

Each of the portable circular saws disclosed in the above-mentioned four Japanese Laid-Open Publication Applications has the controller disposed in a different position from the controller of each of the other three applications, as well as in a different posture from the controller of each of the other three applications. The controller of one embodiment disclosed in patent document 1 is disposed such that the widest surface of the controller is disposed below and parallel to the electric motor. The controller of another embodiment disclosed in patent document 1 is disposed such that the widest surface of the controller is disposed in front of and perpendicular to the electric motor. The controller of the embodiment disclosed in patent document 2 is disposed such that the widest surface of the controller is disposed at the rear of and perpendicular to the electric motor. The controller of the embodiment disclosed in patent document 3 is disposed such that the widest surface of the controller is disposed at the rear of the electric motor so as to be tilted downward in the up-to-down direction, as it extends rearward. The controller of the embodiment disclosed in patent document 4 is disposed such that the widest surface of the controller is horizontally disposed at the rear of the electric motor.

The controller of the embodiment disclosed in patent document 4 includes a display portion on the widest surface of the controller. The display portion indicates a state of the electric motor and/or a state of electric power supplied to the electric motor. The display portion is disposed to be tilted in the same manner as the widest surface of the controller.

Regarding the base of the saw that supports the cutting device main body, a necessary length of the base is determined in consideration of the dimensions of the saw blade. Because of this requirement, it may not be easy to provide a compact base. Making the portable cutting device in a compact manner, therefore, may require the cutting device main body to be made compact, rather than the base. Minimization of the dimensions of the cutting device main body can be achieved by considering the allocation and posture of the controller. For example, both the cutting device main bodies of patent documents 1 and 3 are configured to be shortened in length in the front-to-rear direction due to the specific allocation and posture of the controller. The cutting device main body of patent document 4 is configured to be shortened in length in the up-to-down direction due to the specific allocation and posture of the controller. By shortening the longitudinal length of the portable cutting device in the front-to-rear direction, usability of the portable cutting device can be improved.

As a consequence, when the dimensions of the cutting device main body are to be minimized, the allocation of the display portion may be forced into a limited configuration due to lack of space. The controller and the display portion disclosed in patent document 3 are disposed behind the electric motor such that the display surface of the display portion is disposed parallel to the widest surface of the controller. When the user operates the portable cutting device to cut the workpiece, the user usually performs the cutting task while confirming a state of overlap between the tip of the saw blade in front of the electric motor and a marking line on the workpiece. In this situation, the user may find it difficult to perform the cutting task while viewing the display portion disposed behind the electric motor. Thus, there is a need in such portable cutting devices to have small dimensions in the front-to-rear direction while at the same time including the display portion so that it can be viewed in an easy manner when the cutting task is performed.

SUMMARY

In one exemplary embodiment of the present disclosure, a portable cutting device comprises an electric motor including a rotation shaft, a saw blade that is driven by the electric motor, a controller that controls the electric motor, and a base of the cutting device that supports the cutting device main body, including the electric motor and the controller. The portable cutting device is configured such that the saw blade cuts into a workpiece which the base of the device is placed on, by moving the cutting device main body in the forward direction with respect to the workpiece. Furthermore, the controller is disposed to the front relative to the rotation shaft above the base so as to be tilted frontward in the up-to-down direction as it extends frontward.

According to this embodiment, the controller can be disposed to extend from the up-to-down direction as it extends frontward. Because of this configuration with extension in the up-to-down direction, the length of the cutting device main body can be reduced in the front-to-rear direction. In particular, the length of the cutting device main body can be contained within the length of the base in the front-to-rear direction. As a result, the length of the cutting device can be reduced as a whole. When cutting the workpiece, the user often views the cutting device main body from above in order to confirm a state of overlap between the front tip end of the saw blade and the marking line on the workpiece. The controller is disposed on the front upper side of the rotation shaft of the electric motor. In other words, the controller is disposed to be close to a sight line of the user who is operating the cutting device. However, the controller may be disposed so as to be tilted frontward in the up-to-down direction as it extends frontward. Because of this compact configuration of controller placement, the controller does not block the sight line of the user who wants to confirm the tip end of the saw blade to the marking line of the workpiece. As a result, the user can confirm a state of overlap between the front tip end of the saw blade and the marking line on the workpiece in an easy and simple manner, and commence cutting operation.

In another exemplary embodiment of the disclosure, the controller has a rectangular box-like shape, wherein the controller is disposed such that its widest surface is perpendicular to the saw blade. Accordingly, the controller is tilted with respect to the cutting device main body only in the up-to-down direction. As a result, the controller can be disposed in a relatively compact manner in the front-to-rear and up-to-down directions.

In another exemplary embodiment of the disclosure, the cutting device further comprises a display portion that indicates a state of the electric motor or a state of electric power supplied to the electric motor. In this embodiment, the controller of the cutting device has a rectangular box-like shape, and the display portion is disposed on the widest surface of the controller, or in the vicinity of the widest surface of the controller. The display portion is disposed parallel to the widest surface of the controller. When cutting the workpiece, the user often views the cutting device main body from above in order to confirm a state of overlap between the front tip end of the saw blade and the marking line on the workpiece. The display portion is disposed on the front upper side of the rotation shaft of the electric motor as well as the controller. Because of this configuration, the display portion is disposed within the sight line of the user who is operating the cutting device. Furthermore, the display portion, as well as the controller, is disposed so as to be tilted in the up-to-down direction, as it extends frontward. Thus, in this manner, the display portion does not block the sight line of the user who wants to confirm the location of the front tip end of the saw blade, where it can be sufficiently viewed by the user. As a result, the user can visually confirm a state of overlap between the front tip end of the saw blade and the marking line on the workpiece in an easy and simple manner while viewing the display portion. Furthermore, the display portion is disposed parallel to the widest surface of the controller. Because of this configuration, the display portion may be disposed so as not to protrude from the controller both in the front-to-rear and up-to-down directions, and thus does not block the user's line of sight.

In another exemplary embodiment of the disclosure, the cutting device further comprises a motor housing that houses the electric motor. Furthermore, the motor housing is disposed such that the rotation shaft of the electric motor, which extends from within the motor housing, is perpendicular to the saw blade, and an upper portion of the controller is housed in the motor housing. Because of this configuration, the controller can be disposed in such a manner that the portable cutting device is compactly sized in the front-to-rear and up-to-down directions. Furthermore, by housing the upper portion of the controller in the motor housing, the dimensions of the surroundings of the electric motor can be further minimized.

In another exemplary embodiment of the disclosure, the controller is formed integrally with the display portion. Accordingly, through said integral construction, a number of components of the portable cutting device can be reduced. As a result, compactness and productivity of the portable cutting device can be improved.

In another exemplary embodiment of the disclosure, the cutting device further comprises a rechargeable battery that supplies power to the electric motor. Furthermore, the front end of the rechargeable battery is disposed proximate to a rear portion of the electric motor. Accordingly, the rear end of the rechargeable battery can be disposed relatively at the front portion. As a result, the length of the portable cutting device can be reduced in the front-to-rear direction.

In another exemplary embodiment of the disclosure, the rear end of the rechargeable battery may be disposed at the front of the rear end of the base. Accordingly, the rechargeable battery as a whole can be disposed frontward of said rear end of the base. Thus, the cutting device main body can be disposed so as not to protrude rearward from the rear end of the base in an easy and simple manner. As a result, the length of the portable cutting device can be reduced in the front-to-rear direction.

In another exemplary embodiment of the disclosure, the electric motor is a brushless motor. Accordingly, the electric motor can be further minimized.

DETAILED DESCRIPTION

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, these specific details refer to well-known structures, components and/or devices that are shown in block diagram form in order to avoid obscuring significant aspects of the exemplary embodiments presented herein.

Figure 1:
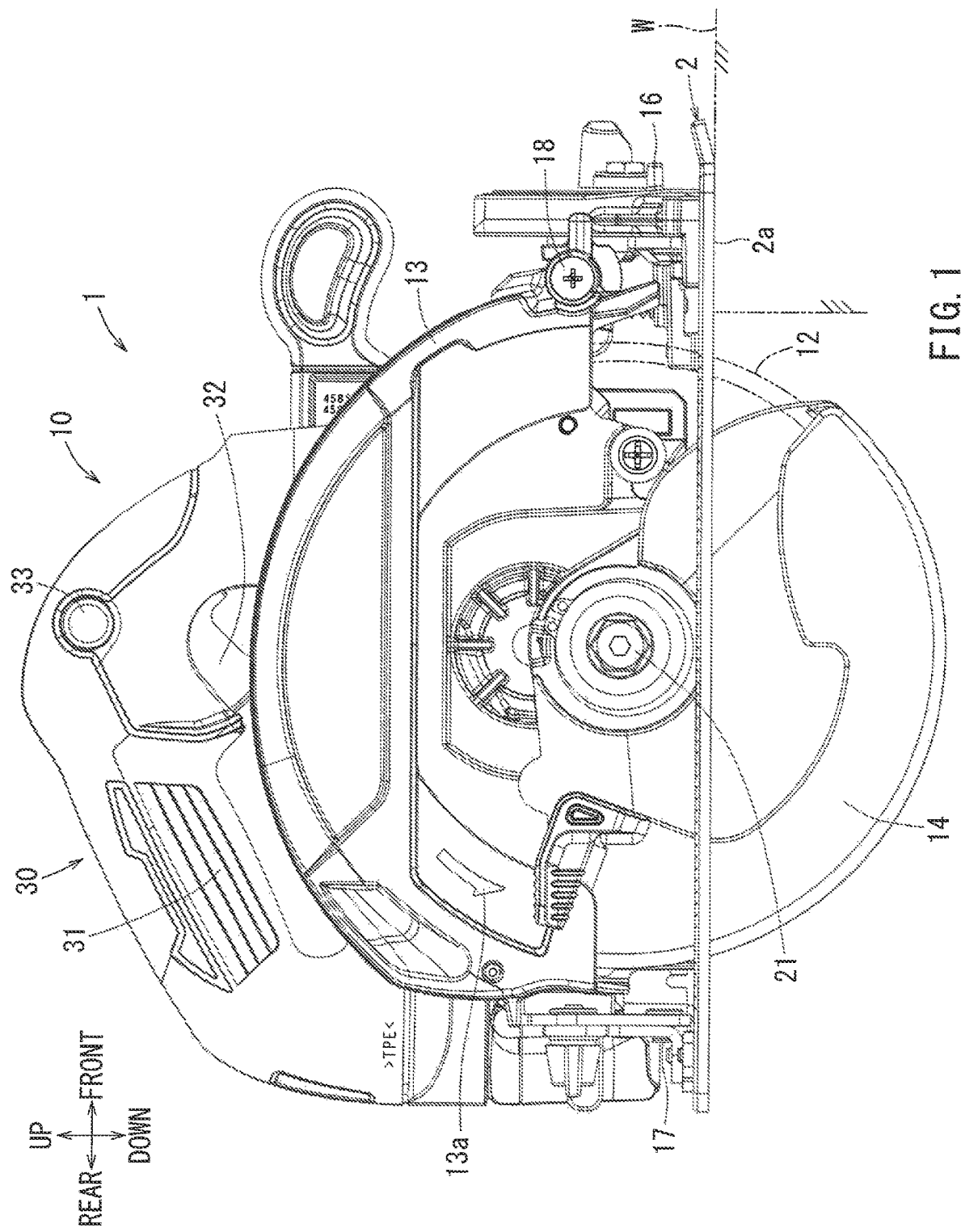
FIG. 1 is a right side view of a cutting device according to an exemplary embodiment of the present disclosure.

Representative, non-limiting embodiments according to the present disclosure will be described with reference to FIGS. 1 to 10. As shown in FIG. 1, a cutting device 1 may be, for example, a portable circular saw. A user can perform a cutting task by holding the cutting device 1 and moving it in a cutting/advancing direction. As shown in the figures and explained below, the direction in which the cutting device 1 advances when it cuts a material to be cut (workpiece W) is referred to as a front direction, and its opposite direction is referred to as the rear direction. The orientation of directions recited as up, down, left, right, front, and rear is relative to the user using the device along a workpiece, based on the user being situated at the position at the rear of the cutting device 1.

Figure 2:
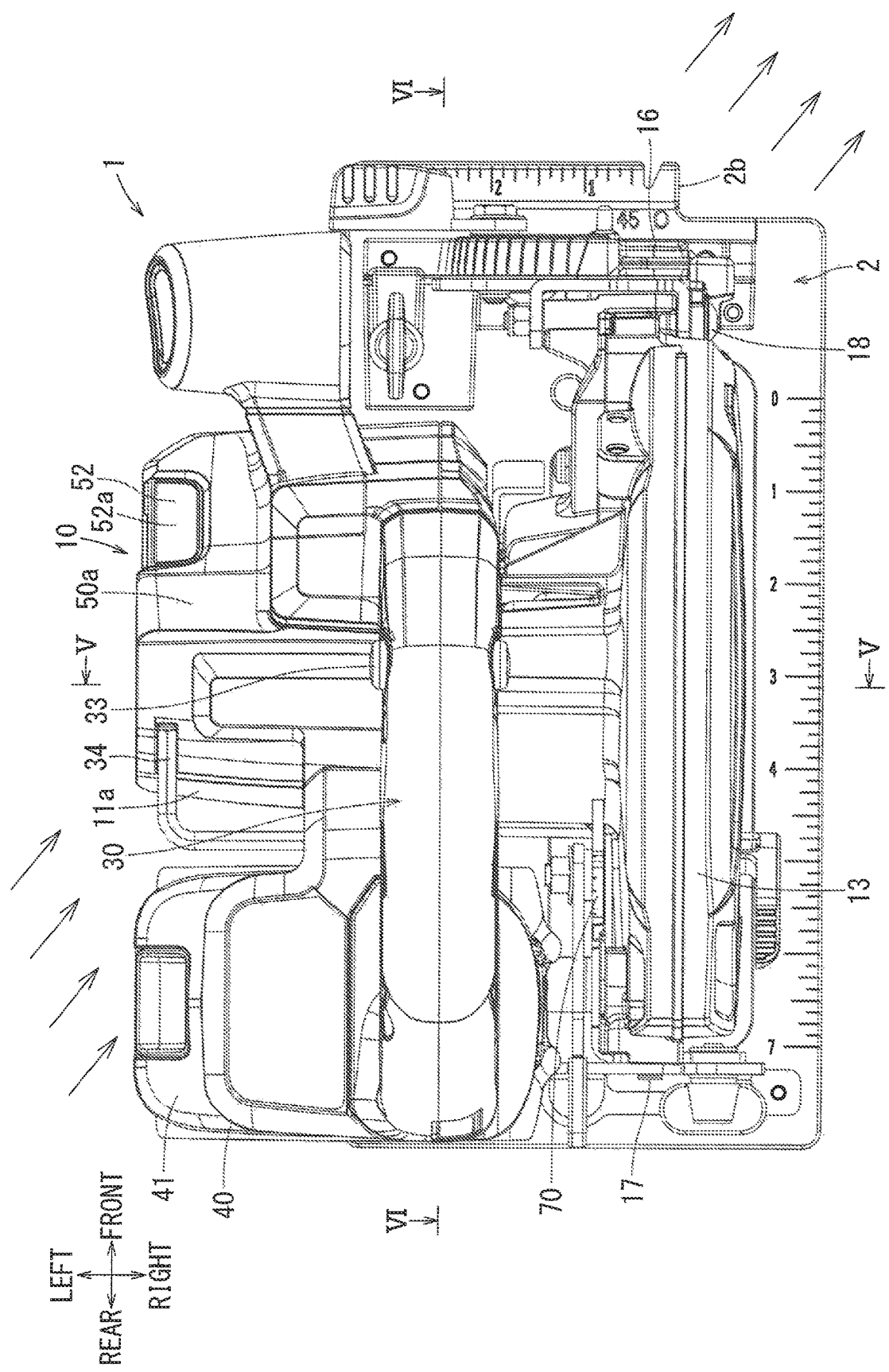
FIG. 2 is a plan view of the cutting device.

As shown in FIG. 1, the cutting device 1 may include a base 2 that is brought into contact with the upper surface of the workpiece W, as well as a cutting device main body 10 that is supported on the upper surface of the base 2. The base 2 may have approximately a rectangular flat plate shape. The lower surface 2a of the base 2 may be brought into contact with the workpiece W when the cutting device 1 is used. As shown in FIG. 2, a peripheral guide portion 2b at the front edge of the base for aligning the device with a marking line on the workpiece W may be provided at the front portion of the base 2. Overlapping the guide portion 2b with the marking line on the workpiece W may serve as a guide for aligning the tip of the saw blade 12, at the rear of the guide portion 2b, with the marking line, where when the saw is advanced the tip of the saw blade eventually reaches the initial position (before advancement of the saw) of the guide portion 2b.

Figure 3:
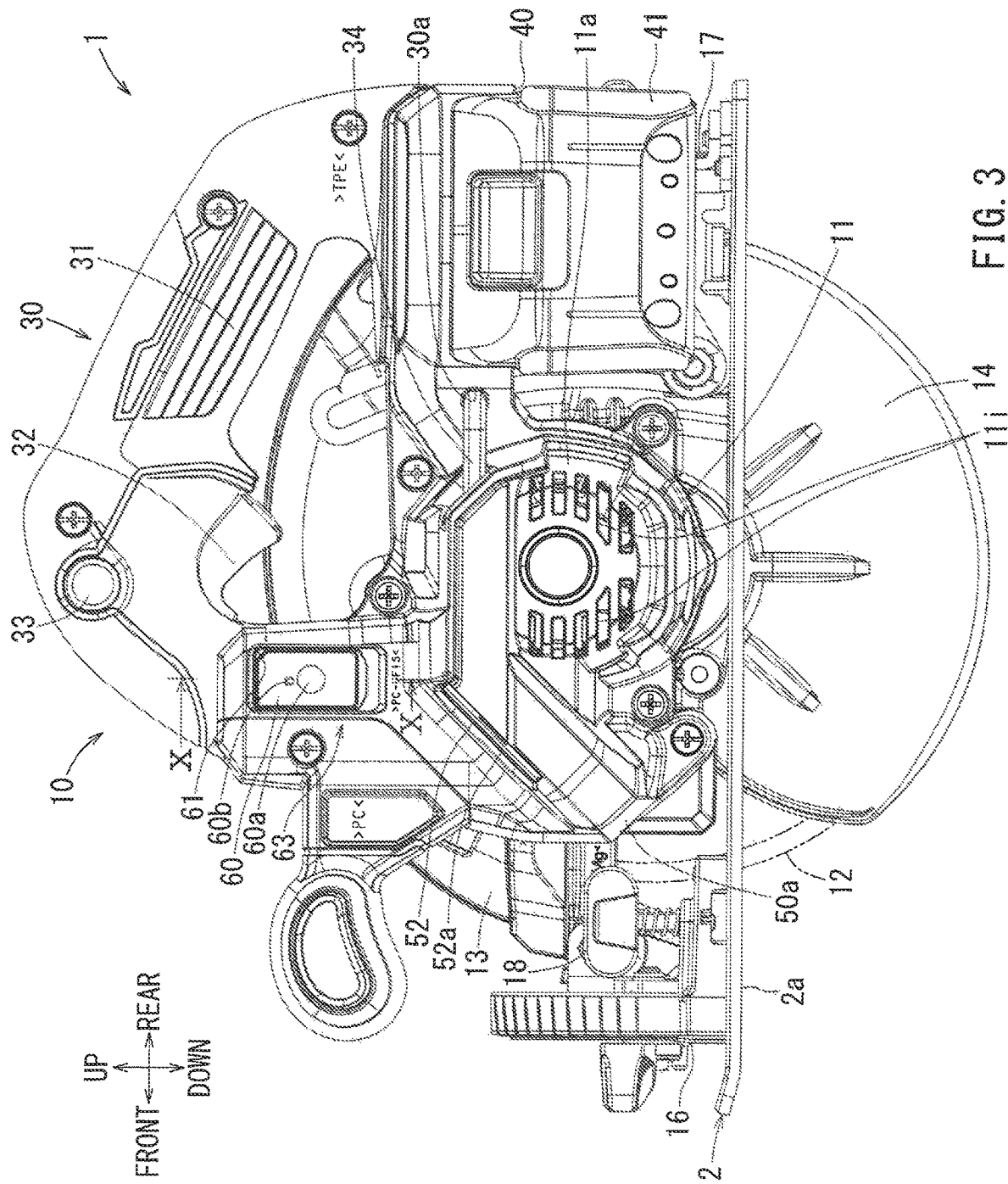
FIG. 3 is a left side view of the cutting device.

As shown in FIGS. 1 and 3, the cutting device main body 10 may include the circular saw blade 12 that rotates with an electric motor 11 serving as a drive source. The upper half of the circumferential periphery of the saw blade 12 may be covered by a fixed cover 13. Approximately the entire lower half of the saw blade 12, including the lower circumferential periphery; may protrude downward below the lower surface 2a of the base 2. This protruding portion of the saw blade 12 is able to cut into the workpiece W to perform a cutting task. The saw blade 12 may rotate in a counterclockwise direction as shown in FIG. 1, which is counterclockwise from the right side view of the cutting device. A void arrow 13a on the right side surface of the fixed cover 13 shown in FIG. 1 indicates the direction of rotation of the saw blade 12.

As shown in FIG. 1, approximately the entire lower half of the circumferential periphery of the saw blade 12 may be covered by a movable cover 14. The movable cover 14 may be supported so as to be capable of being opened/closed along the circumferential periphery of the saw blade 12, in the circumferential direction. The movable cover 14 may be biased in a closing direction (in a counterclockwise direction in FIG. 1, relative to the right side view of the cutting device being used by a user) by a spring (not shown in the figures). When the cutting device 1 is moved forward by the user, a front end portion of the movable cover 14 may be brought into contact with the rear end portion of the workpiece W. When the cutting device 1 is moved further forward from this position, the movable cover 14 may rotate in the clockwise opening direction (relative to the right side as seen in FIG. 1), which exposes the saw blade 12.

As shown in FIGS. 1 and 2, the cutting device main body 10 may be supported so as to be tiltable in the left-to-right direction with respect to the base 2 via the front and rear tilt supporting portions, 16 and 17, respectively. Through the presence of this tiltable configuration, the saw blade 12 can be tilted in the left-to-right direction with respect to the base 2. For example, when the cutting main body 10 is tilted by 45° in the rightward direction, the saw blade 12 can also correspondingly be tilted by 45° in the rightward direction with respect to the lower surface 2a of the base 2. By doing so, the user can perform a cutting task on a workpiece, where the cutting surface may also be tilted by 45°.

As shown in FIGS. 1 and 2, the cutting device main body 10 may be supported so as to be rotated in the up-to-down direction with respect to the base 2 about an up-to-down swing supporting shaft 18. By rotating and changing the position of the cutting device main body 10 in the up-to-down direction relative to the base 2, the protruding length of the saw blade 12 protruding downward below the lower surface 2a of the base 2 can be altered. As a result, by rotating and changing the position of the cutting device main body 10 in the up-to-down direction, the cutting length of the saw blade 12 with respect to the workpiece W can be changed. FIGS. 1 to 9 shows a state where the cutting length is set to its maximum (which is also called as the bottom dead center position).

Figure 5:
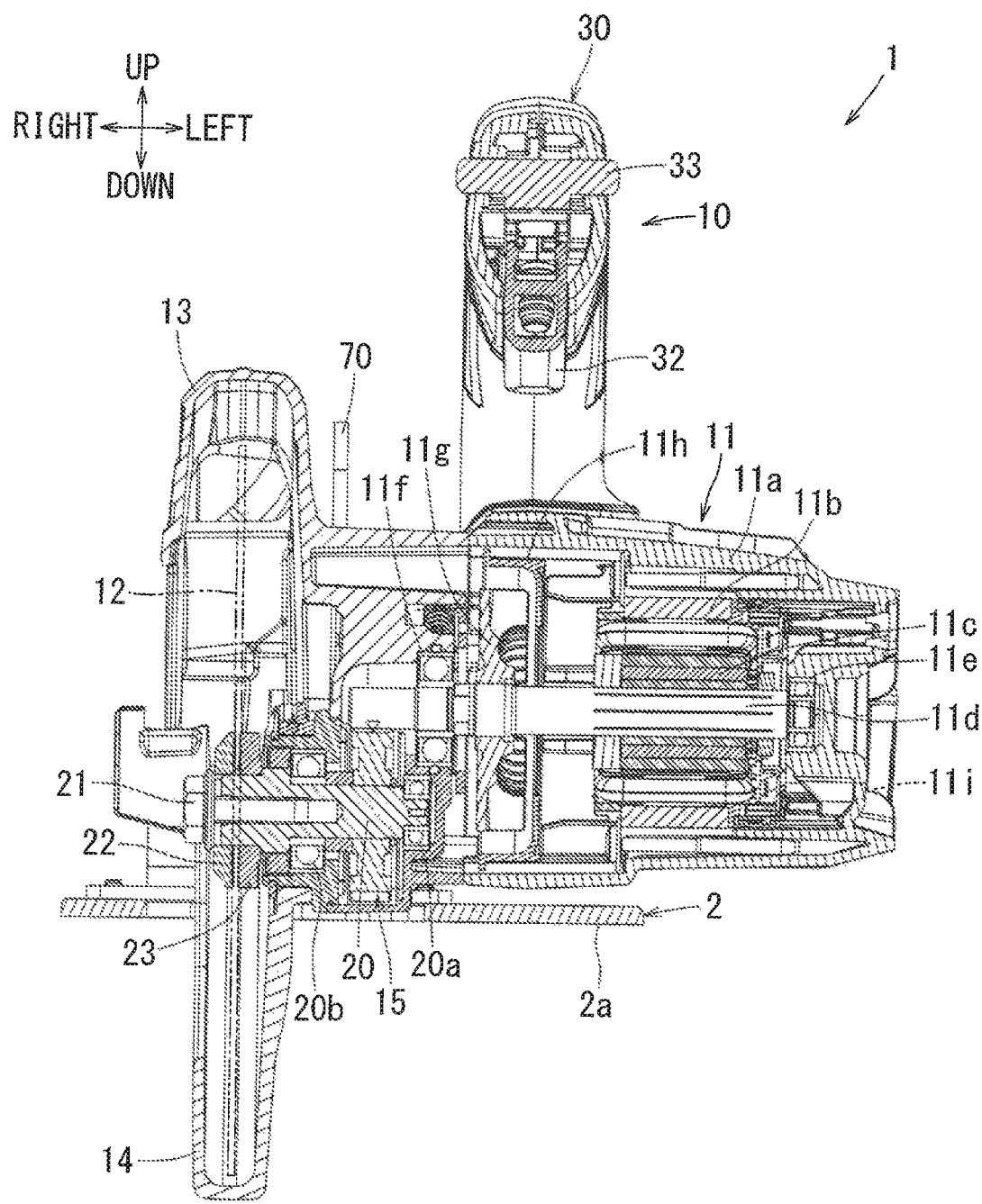
FIG. 5 is a cross-sectional view taken along line V-V of FIG. 2.

As shown in FIG. 5, the electric motor 11 may be housed in a motor housing 11a that is disposed on the left side of the fixed cover 13. A DC brushless motor may be used as the electric motor 11. The electric motor 11 may include a rotation shaft 11d, a stator 11b, and a rotor 11e. The rotation shaft 11d may extend in the left-to-right direction perpendicular to the saw blade 12, which extends radially outward in the plane perpendicular to the left-to-right direction. The rotation shaft 11d may be supported by the motor housing 11a in a rotatable manner via bearings 11e and 11f. The stator 11b may be supported by the inner peripheral surface of the motor housing 11a to remain stationary in an unrotatable manner. The rotor 11e, in turn, may be disposed on the inner peripheral circumferential side of the stator 11b. The rotor 11e may be fitted around the entirety of the circumference of the outer peripheral surface of rotation shaft 11d, and may be supported so as to rotate synchronously with the rotation shaft 11d, about rotation shaft 11d, with respect to the motor housing 11a. A rotation angle of the rotor 11e may be detected by a sensor circuit board not shown in the figures.

As shown in FIG. 5, a reduction gear portion 15 may be provided on the right side of the electric motor 11 on the left side of the fixed cover 13. A rotation power of the electric motor 11 may be output through said reduction gear portion 15 to a spindle 20. Using the reduction gear portion 15 may result in one-stage speed reduction by a gear extending radially outward from the longitudinal axis of the rotation shaft 11d engaging with a gear extending radially outward from the longitudinal axis of spindle 20, both of which are not shown in the figures. The spindle 20 may be supported by bearings 20a and 20b in a rotatable manner. The spindle 20 may horizontally extend in the right-to-left direction parallel to the rotation shaft 11d, and the tip end of the spindle 20 may protrude to such an extent in the right direction that it extends into the interior of the fixed cover 13. The circular saw blade 12 at its radial center may be attached to the tip end of the spindle 20. The saw blade 12 may be attached to the tip end, at the right end of the spindle 20, in a screwed-manner by a single bolt 21 such that it is firmly held between an inner flange 23, touching and adjacent to the immediate left of the saw blade 12, and an outer flange 22, touching and adjacent to the right of the saw blade 12.

As shown in FIG. 5, a cooling fan 11g may be attached to the rotation shaft 11d to the right of the rotor 11e. The cooling fan 11g may rotate synchronously with the rotation shaft 11*d*, about the longitudinal axis of shaft 11*d*, within the interior of the motor housing 11*a*. The left side of the cooling fan 11*g* may be covered with a baffle plate 11*h*. As shown in FIGS. 3 and 5, a plurality of intake ports 11*i* which extend into the left wall of the motor housing 11*a* may be provided on the left wall of the motor housing 11*a*. When the cooling fan 11*g* rotates in accordance with rotation of the motor 11, said rotation may introduce outside air into the interior of the motor housing 11*a* through the intake ports 11*i*. The introduced air may flow in the right direction toward the cooling fan 11*g*, and thus may cool the stator 11*b* and the rotor 11*e*.

As shown in FIGS. 1 and 3, the cutting device main body 10 may be provided with a grip 30 for the user to hold. The grip 30 may extend approximately in the front-to-rear direction above the motor housing 11*a* and may approximately have the shape of an upward facing D-shaped loop. An elastomer resin layer 31 may be provided on the surface of the grip 30 for preventing slippage when the device main body 10 is gripped by the user.

Figure 6:
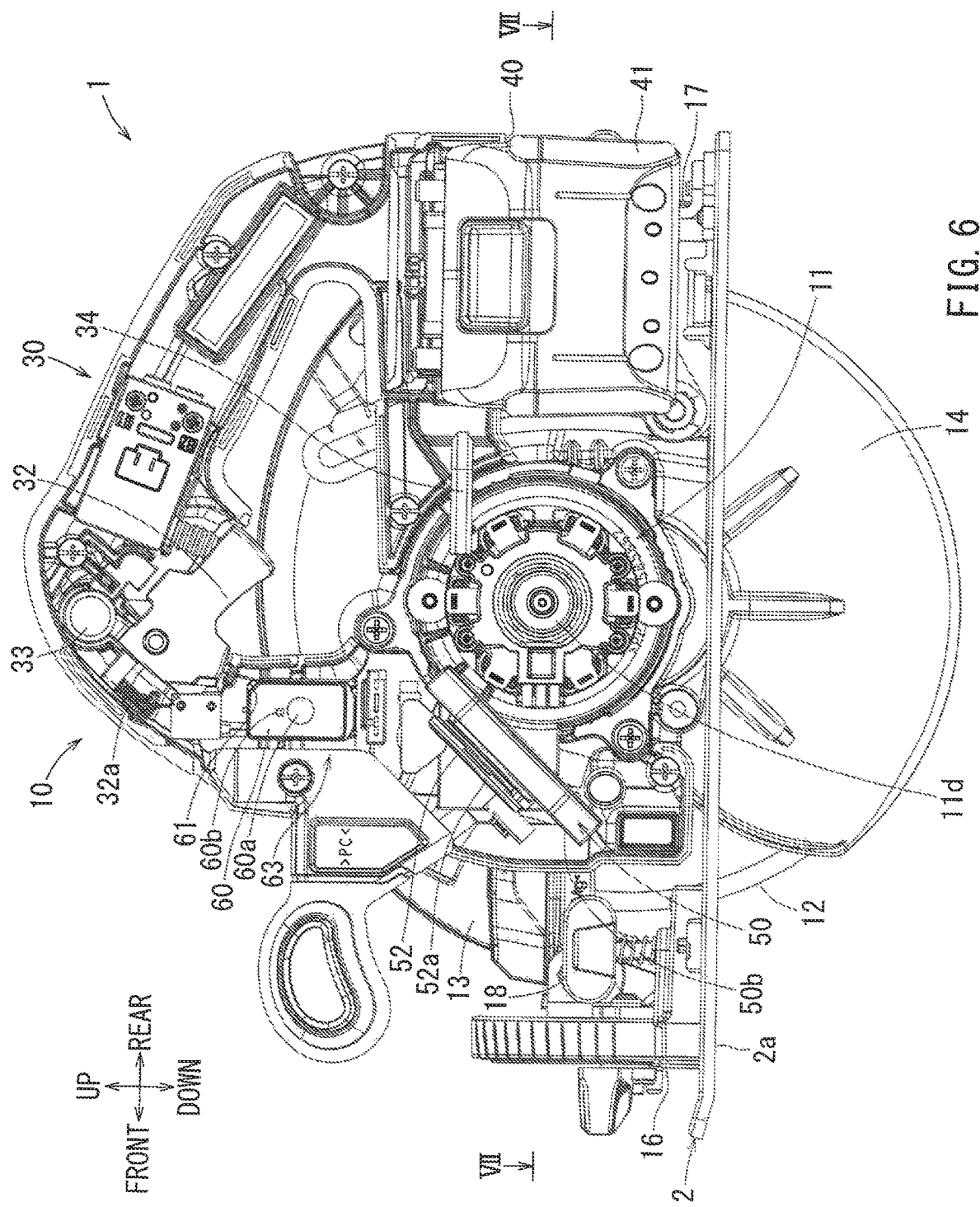
FIG. 6 is a cross-sectional view taken along line VI-VI of FIG. 2.

As shown in FIGS. 5 and 6, a pullable trigger 32 may be provided on the front side of the inner peripheral circumferential surface of the D-shaped loop grip 30. The pullable nature of the trigger 32 may be defined by it protruding downward from the grip 30 by a biasing force of a spring 32*a*. Furthermore, a lock-off button 33 may be provided above the trigger 32 in a retractable manner. The lock-off button 33 can protrude in the left-to-right direction. When both the lock-off button 33 is pushed and the trigger 32 is pulled by the fingers of a user who holds the grip 30, the electric motor 11 may start for the duration of the time when the fingers of the user pull the trigger 32 upwards. In other words, when the pulling operation of the trigger 32 is stopped, the electric motor 11 also stops. In case the lock-off button 33 is not pushed, the trigger 32 cannot be pulled due to the presence of a stopper. Because of this configuration, unintended activation of the electric motor 11 can be prevented.

As shown in FIGS. 2 and 3, a retention hole 30*a* for holding a hexagonal wrench 34 may be provided at the rear end portion of the motor housing 11*a*. The hexagonal wrench 34 may be formed to have an L-shape and its rear end may be inserted into the retention hole 30*a*. The hexagonal wrench 34 may be used for tightening or loosening the bolt 21 for adjusting the attaching or detaching of the saw blade 12 to or from the spindle 20.

Figure 4:
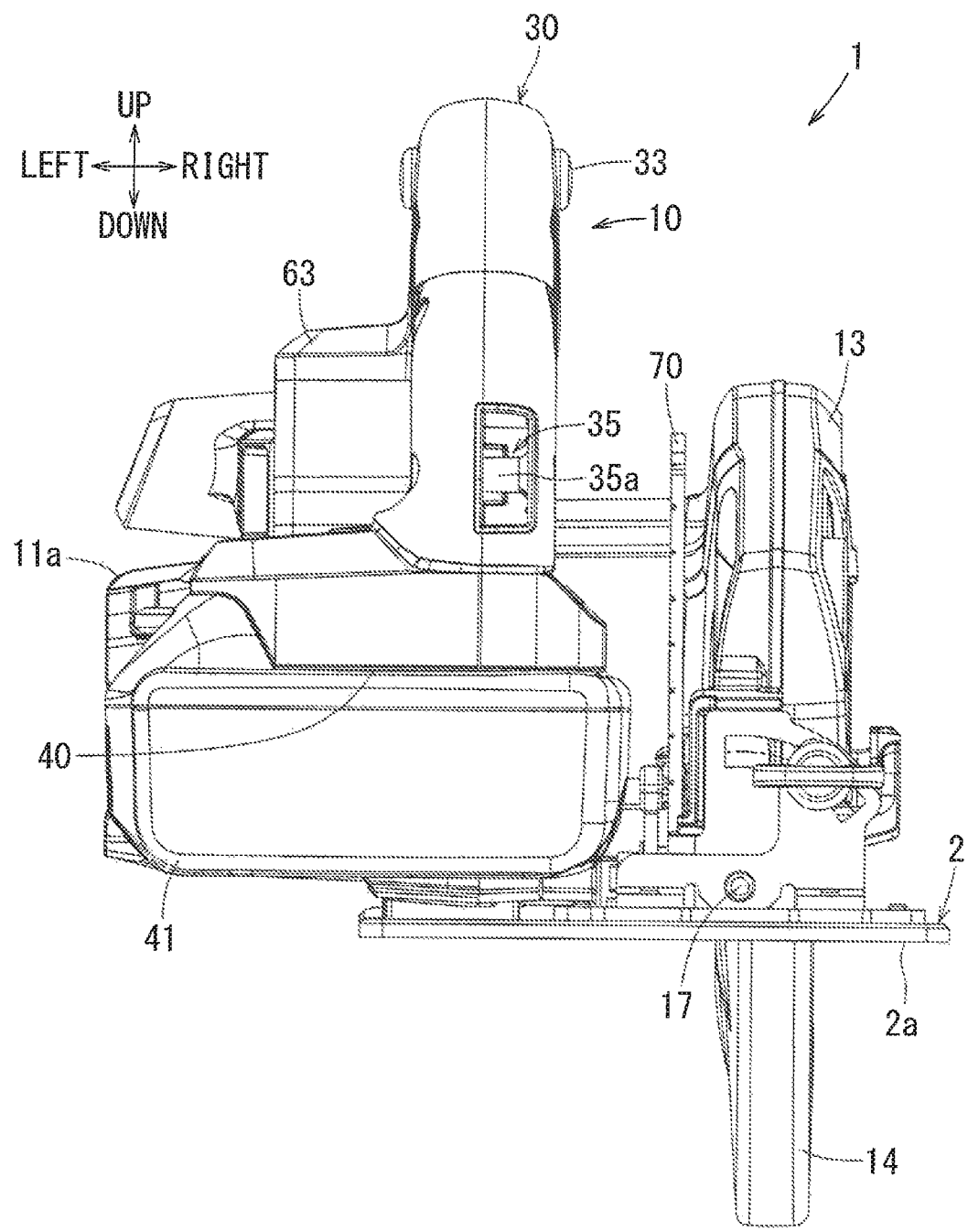
FIG. 4 is a rear view of the cutting device.

As shown in FIG. 4, a hook 35 open in the rearward direction may be provided at the rear end of the grip 30. The hook 35 may have a hook support 35*a* at approximately a center portion, in the up-to-down direction of a rectangular recess-shaped hole. The hook support 35*a* may extend in the left-to-right direction and may be formed integrally with the grip 30, in a one-piece construction. When the hook support 35*a* is viewed in the lateral direction, the cross-section thereof may be defined by a U-shaped space that is rotated by 90 degrees in the counter-clockwise direction (from the rear of the cutting device as seen in FIG. 4). A carabiner or a rope can be hooked to the hook support 35*a*. The carabiner or the rope can be hung from a handrail or a scaffold. Because of this configuration, the cutting device 1 can be hung from the handrail or the scaffold.

As shown in FIGS. 2 to 4, a battery attachment portion 40 may be provided at the rear of the motor housing 11*a* at the bottom of the rear end portion of the grip 30. The battery attachment portion 40 may be provided adjacent to, and to the rear of, the rear end of the motor housing 11*a*. One rechargeable battery 41 may be attached to the lower surface of the battery attachment portion 40. The rechargeable battery 41 may be a lithium ion battery that can output, for example, 18 volts, and that can be detached from the battery attachment portion 40 for recharging by a dedicated charger, for repeated use. The rechargeable battery 41 may be used as a power source which is inter-compatible with other chargeable electric power tools such as, for example, a screw driver or an electric drill etc.

As shown in FIGS. 2 and 3, the rechargeable battery 41 can be attached to the battery attachment portion 40 by a sliding mechanism, where the rechargeable battery 41 is slid in approximately the horizontal direction from left to right with respect to the lower surface of the battery attachment portion 40. The rechargeable battery 41 is attached to the battery attachment portion 40 in this manner, and may be disposed such that its rear end is positioned in front of the rear end of the base 2 and such that its lower end is positioned above the upper surface of the base 2. The rechargeable battery 41 attached to the battery attachment portion 40 may be electrically connected to the electric motor 11 and the controller 50. The rechargeable battery 41 attached to the battery attachment portion 40 may be detachably removed from the battery attachment portion 40 by being slid in approximately the horizontal direction from right to left with respect to the lower surface of the battery attachment portion 40.

As shown in FIGS. 3 and 6, a part of a controller housing 50*a* may be connected to, and adjacent to, the front portion of the motor housing 11*a*, lying to the front of said front portion. The controller housing 50*a* may have an internal space in which the box-shaped controller 50 can be inserted and housed. The controller housing 50*a*, the motor housing 11*a*, the grip 30, and the battery attachment portion 40 may be integrally formed using resin molding.

Figure 7:
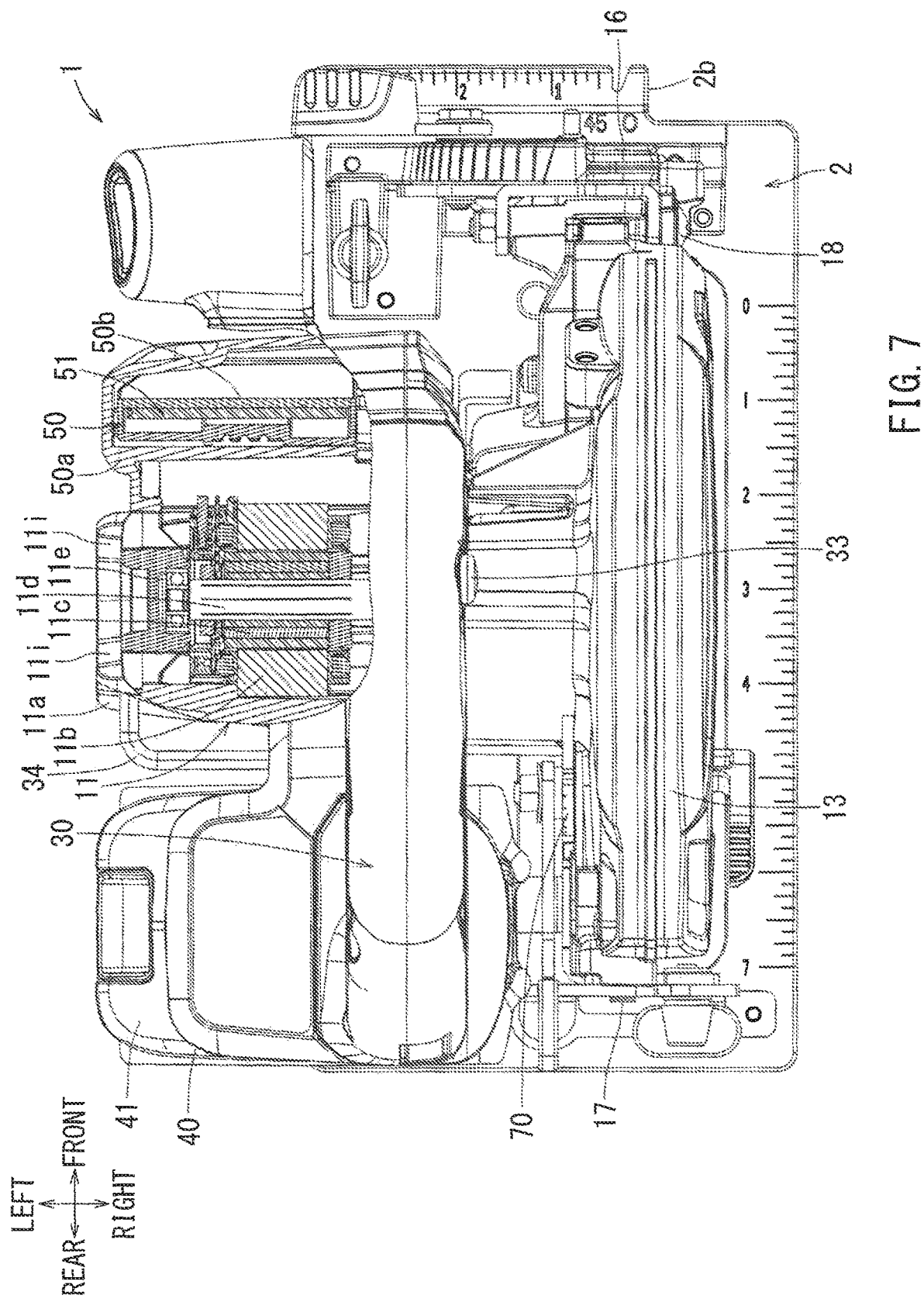
FIG. 7 is a plan view of the cutting device including in part a cross-sectional view taken along line VII-VII of FIG. 6.
Figure 8:
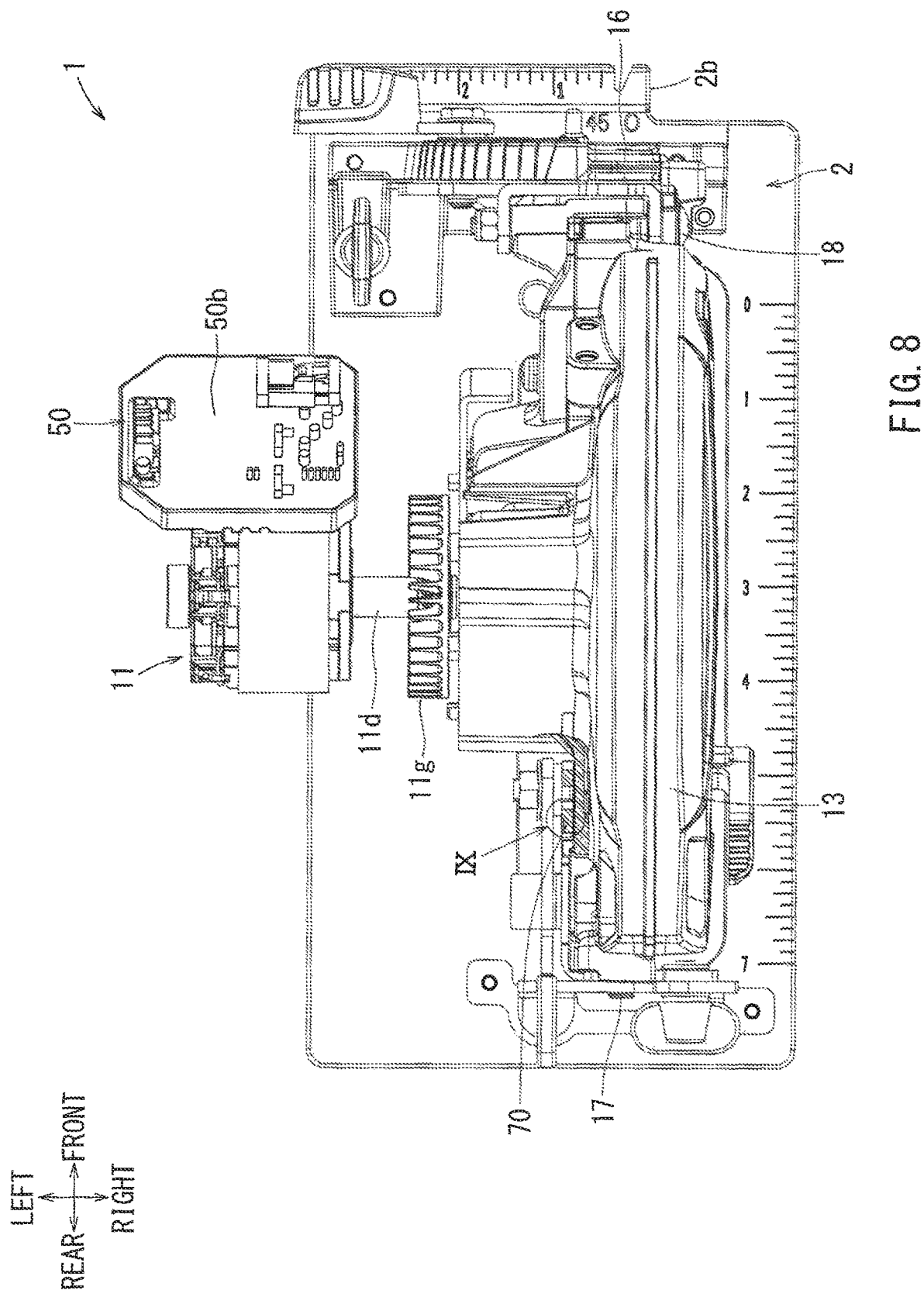
FIG. 8 is a plan view of the cutting device including in part a cross-sectional view of the cutting device where a motor housing is removed.

The controller 50 shown in FIGS. 6 to 8 may be formed to comprise a control circuit 51 and a shallow box-shaped resin-molded case, which houses said control circuit 51. The controller 50 and the controller housing 50*a* may be disposed to the front of the rotation shaft 11*d*, and above the base 2. Furthermore, an upper portion of the controller 50 as well as a corresponding upper portion of the controller housing 50*a*, housing said upper portion of the controller 50, may be disposed above the rotation shaft 11*d* when viewed from the lateral side of the cutting device main body 10, as seen for example in FIG. 6. The controller 50 may be housed in the controller housing 50*a* such that the controller 50 is disposed parallel to the controller housing 50*a*. The controller 50 and the controller housing 50*a* may collectively be disposed so as to be tilted frontward in the up-to-down direction, as they extend frontward.

As shown in FIGS. 6 and 8, the controller 50 may be in an approximately rectangular parallelepiped shape, having its shortest side spanning the thickness of the parallelepiped and the widest surface of the parallelepiped forming a plane intersecting the shortest side. The widest surface 50*b* of the controller 50 may be disposed perpendicular to the saw blade 12. The front end of the controller 50 may be disposed below the rotation shaft 11*d*. In contrast, the rear end thereof may be disposed above the rotation shaft 11*d*. As shown in FIGS. 3 and 6, the rear end (the upper end) of the controller 50 may be housed in the motor housing 11*a*.

The controller 50 may include a power circuit and a control circuit that controls mainly the electric motor 11. In more detail, the control circuit of the controller 50 may comprise a microprocessor that transmits a control signal to the electric motor 11 based on the positional information of the rotor 11*e* that is detected by the sensor circuit of the electric motor 11, a drive circuit composed of FETs that switches the current of the electric motor 11 based on the control signal received from the control circuit, and an auto-stop circuit that interrupts power supply to the electric motor 11 based on a detection results from the rechargeable battery 41 in order to prevent over-discharging and over-current conditions.

As shown in FIGS. 3 and 6, a display portion 52 may be provided integrally with the controller 50 on the upper side of the controller 50. The display portion 52 may include, for example, LEDs and/or a liquid crystal display device. The display portion 52 may visually inform the user of various information, mainly about the status of electric power supplied to the electric motor 11 and the operation state of the electric motor 11. A display surface 52*a* of the display portion 52 may be disposed on the widest surface plane 50*b* of the controller 50, such that it is parallel to the widest surface 50*b* of the controller 50, and so as to face opposite to the widest surface plane 50*b* in the direction spanning the thickness of the controller 50. Accordingly, the display surface 52*a* of the display portion 52 can be viewed from above the cutting device main body 10 while the grip 30 is held by the user. Furthermore, it can also be viewed, for example, from the rear upper portion of the cutting device main body 10.

When cutting a workpiece W, the user may visually confirm the display surface 52*a* from the rear left of and above the cutting device main body 10. At the same time, the user may also simultaneously want to visually confirm a front tip end of the saw blade 12, or alternatively the guide portion 2*b* or the marking line on the workpiece W in the line-of-sight direction (in the direction shown by the arrow of FIG. 2). The display surface 52*a* as well as the controller housing 50*a* may be tilted frontward in the up-to-down direction as both components collectively extend frontward. Because of this arrangement of the display surface 52*a* and the controller housing 50*a*, the user can visually confirm the front tip end of the saw blade 12, or alternatively the guide portion 2*b* or the marking line of the workpiece W, all the while viewing the display portion 52, where the user's view is blocked by neither the display surface 52*a* nor the controller housing 50*a*.

As shown in FIGS. 3 and 6, an adapter housing portion 63 may be provided on the front left surface of the grip 30. The adapter housing portion 63 may include an adapter insertion portion 61 on the left side surface thereof. The adapter insertion portion 61 may be formed to be in a rectangular parallelepiped recessed shape from the left side surface of the grip 30 inwardly toward the right direction. A radio communication adapter 60 may be inserted and attached to the adapter insertion portion 61. The radio communication adapter 60 may be electrically connected to a radio communication controller (not shown in the figures) via connection terminals 60*c* shown in FIG. 10. The radio communication controller may be provided in, for example, the controller 50. The radio communication adapter 60 can also communicate with an auxiliary device such as, for example, a dust collector for collecting cutting dust and debris. Through said communication, the auxiliary device can start/stop in a synchronous manner with the starting/stopping operation of the cutting device 1 by use of the radio communication.

The radio communication adapter 60 can be previously associated (paired) with another radio communication adapter that is attached to such an auxiliary device such that radio communication between the two can take place. The association (pairing) between the cutting device and the auxiliary device can be performed by pressing a button 60*a* on the exterior periphery of the radio communication adapter 60 as shown in FIGS. 3 and 6, and by similarly pressing a corresponding button of the radio communication adapter of the auxiliary device simultaneously. In a state where the pairing is performed, when the cutting device 1 starts by a pressing operation of the trigger 32, the start information may be transmitted from the radio communication adapter 60 to the auxiliary device. The auxiliary device may receive a signal from the radio communication adapter 60 and then start according to said signal. The user may be able to be aware of the status regarding whether radio communication is being performed between the cutting device 1 and the auxiliary device by viewing lighting of a lamp 60*b* provided on the radio communication adapter 60.

As shown in FIGS. 4, 7, and 8, a depth guide 70 may be provided on the rear left side of the fixed cover 13. The depth guide 70 may extend upward from the base 2 perpendicular thereto, in the vertical down-to-up direction, and parallel to the fixed cover 13. The depth guide 70 may have approximately a plate shape, extending radially, and may be disposed such that its thickness direction spans a direction parallel to the left-to-right direction. Furthermore, the depth guide 70 may have a fan-like shape forming a circular arc extending from its rear bottom end that contacts the upper surface of the base 2 to its front upper end. A scale for indicating a cutting depth of the saw blade 12 may be marked at regular intervals along the circumferential direction on the depth guide 70. The scale may indicate an amount that the saw blade 12 protrudes below base 2 and may be used as a reference of the cutting depth of the workpiece W.

Figure 9:
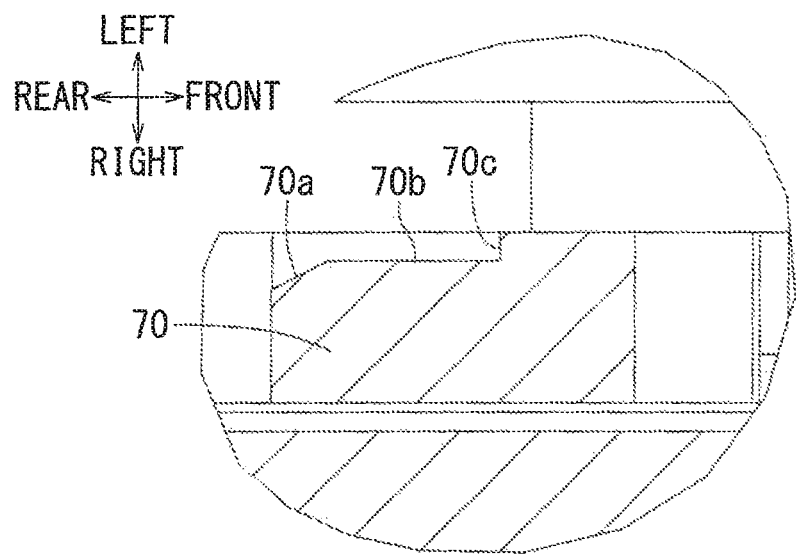
FIG. 9 is an enlarged cross-sectional view of IX of FIG. 8.
Figure 10:
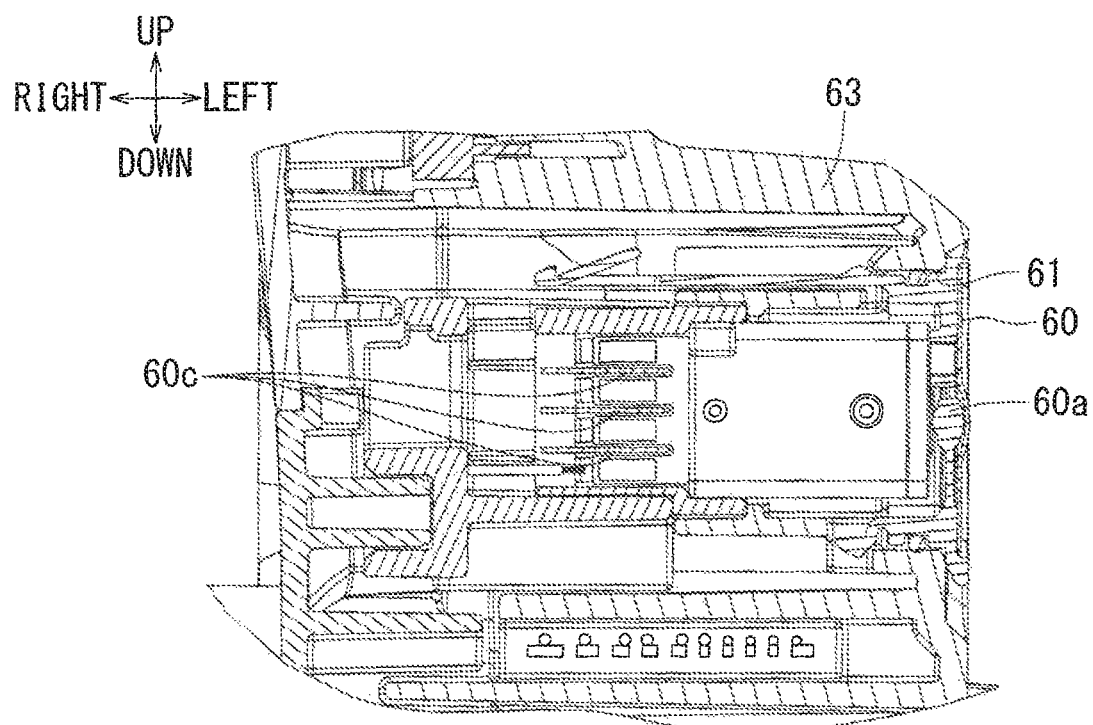
FIG. 10 is a cross-sectional view taken along line X-X of FIG. 3.

As shown in FIG. 9, the scale of the depth guide 70 may be marked on a taper display surface 70*a*, a lateral display surface 70*b*, and a rear display surface 70*c*. The lateral display surface 70*b* may be formed at the bottom of a groove formed along the rear side edge of the left end surface of the depth guide 70. The rear display surface 70*c* may be formed on the front wall surface of the groove. The taper display surface 70*a* may be formed extending rightward from the left end edge on the rear side of the depth guide 70 so as to be tilted facing the rear left with respect to the cutting device 1. Because of this arrangement, even when the depth guide 70 is viewed from the rear or the above, the scale of the depth guide 70 can be read in an easy and simple manner. Therefore, high visibility of the scale of the depth guide 70 can be obtained.

As discussed above, the controller 50 may be disposed to be tilted frontward in the up-to-down direction as it extends frontward as shown in FIG. 6. Because of this configuration, the length of the cutting device main body 10 can be reduced in the front-to-rear direction. In particular, the length of the cutting device main body 10 in the front-to-rear direction may be able to be contained within the front-to-rear length of the base 2. As a result, the length of the cutting device 1 can be reduced as a whole. When cutting the workpiece W, the user may often view the cutting device main body 1 from above in order to confirm a state of overlap between the front tip end of the saw blade 12 and a marking line on the workpiece W. The controller 50 may be disposed on the front upper side, relative to the rotation shaft 11*d* of the electric motor 11. In other words, the controller 50 may be disposed to be close to a sight line of the user who is operating the cutting device 1. However, the controller 50 may be disposed so as to be tilted frontward in the up-to-down direction as it extends frontward. Because of this configuration, the controller 50 may not block the sight line of the user who wants to confirm the location of the tip end of the saw blade 12. As a result, the user can confirm a state of overlap between the front tip end of the saw blade 12 and the marking line on the workpiece W in an easy and simple manner.

As shown in FIGS. 6 and 8, the controller 50 may be disposed such that the widest surface 50b is perpendicular to the saw blade 12. Therefore, the controller 50 may be disposed so as to be tilted in the up-to-down direction without being tilted in the left-to-right direction with respect to cutting device main body 10. Because of this configuration, the dimensions of the cutting device main body 10 can be relatively minimized with respect to both the front-to rear and up-to-down directions.

As shown in FIG. 6, the display portion 52 may be disposed on the widest surface 50b of the controller 50, parallel to said widest surface 50b. When cutting the workpiece W the user may often view the cutting device main body 1 from above in order to confirm a state of overlap between the front tip end of the saw blade 12 and a marking line on the workpiece W. The display portion 52, collectively with controller 50, may be disposed on the front upper side relative to the rotation shaft 11d of the electric motor 11. Because of this configuration, the display portion 52 may be disposed on the sight line (on the arrow marks shown in FIG. 2) of the user who is operating the cutting device 1. Furthermore, the display portion 52, as well as controller 50, may collectively be disposed so as to be tilted frontward in the up-to-down direction as they extends frontward. Thus, because of this tilting configuration, though the display portion 52 is located along the sight line, it does not block the sight line of the user who wants to confirm the location of the front tip end of the saw blade 12 while the display portion 52 can also simultaneously be viewed by the user. As a result, the user can confirm a state of overlap between the front tip end of the saw blade 12 and a marking line on the workpiece W in an easy and simple manner while viewing the display portion 52. Furthermore, the display surface 52a may be disposed parallel to the widest surface 50b. Because of this configuration, the display portion 52 can be disposed so as to not protrude from the controller 50 in either the front-to-rear and up-to-down directions.

As shown in FIGS. 3 and 7, the motor housing 11a may be disposed such that the rotation shaft 11d is perpendicular to the saw blade 12. The uppermost portion of the controller 50 may be housed in the motor housing 11a. Accordingly, the tilted disposition of the controller 50 results in compactness of the cutting device 1 in the front-to-rear and up-to-down directions. Furthermore, by housing the uppermost portion of the controller 50 in the motor housing 11a, dimensions of the surrounding area of the electric motor 11 can be further minimized. Furthermore, as shown in FIG. 6, the controller 50 may be formed integrally with the display portion 52 in the cutting device 1. Accordingly, a number of components of the cutting device 1 can be reduced. Thus, productivity of the cutting device 1 can be improved.

As shown in FIG. 3, the rechargeable battery 41 may be disposed close to and behind the electric motor 11, to its immediate rear. Therefore, the rear end of the rechargeable battery 41 can be disposed relatively more forward compared to a configuration where the battery 41 may not be placed to the immediate rear of the electric motor 11. Thus, the length of the cutting device 1 can be reduced in the front-to-rear direction. Furthermore, the rear end of the rechargeable battery 41 may be disposed in front of the rear end of the base 2. Because of this configuration, the cutting device main body 10 can be disposed so as to not protrude rearward from the rear end of the base 2. As a result, the length of the cutting device 1 can be reduced in the front-to-rear direction, and can be contained within the front-to-rear length of the base 2, in an easy and simple manner.

As shown in FIG. 5, the electric motor 11 may be a brushless motor. Accordingly, the dimensions of the electric motor 1 can be further minimized.

It is noted that the present teachings are not limited to the cutting device 1 according to above-described embodiments, and it is understood that variations and modifications may be effected without departing from the spirit and scope of the present teachings. FIG. 1 shows the cutting device 1 in which the circular saw blade 12 is used. Alternatively, the present teachings can be applied to other electric tools such as, for example, a portable jig saw in which a thin linear saw blade is used. In the above embodiments, the controller 50 may be in a rectangular parallelepiped shape. However, the controller may be instead in, for example, a hexagonal or cylindrical box shape.

The tilt angle of the controller 50 in the front-to-rear direction shown in FIG. 6 is 30° to 60° with respect to the horizontal. Alternatively, the controller 50 may be tilted more slightly, for example, at 10° to 30° with respect to the horizontal, in order to improve visibility of the display portion 52. Further alternatively, the controller 50 may conversely be tilted even more acutely, for example, at 60° to 80° with respect to the horizontal in order to improve visibility of a state of overlap between the tip end of the saw blade 12 and the marking line on the workpiece W. As shown in FIG. 6, the display portion 52 may be disposed slightly above the center portion of the widest surface 50b in the up-to-down direction. Alternatively, the display portion 52 may be disposed at an upper or lower portion of the controller 50, and may be adjusted accordingly, to improve visibility of the display portion 52 or to improve visibility of a state of overlap between the tip end of the saw blade 12 and the marking line on the workpiece W.

The cutting device 1 shown in the figures may be configured such that the rechargeable battery 41 is attached to the cutting device 1 as the power source supplied to the electric motor 11. Alternatively, the cutting device 1 may be configured such that a power cable through which electric power from DC or AC is supplied to the cutting device 1 is connected to the cutting device main body 10. In such a case, it is preferable that a cable guard of the power cable does not protrude rearward from the rear end of the base 2 but rather protrudes in the leftward or rightward direction.

What is claimed is:
1. A portable cutting device, comprising:
an electric motor including a rotation shaft;
a saw blade that is driven by the electric motor;
a controller that controls the electric motor;
a base that supports a cutting device main body of the portable cutting device, the cutting device main body including the electric motor and the controller; and
a motor housing that houses the electric motor and a controller housing that houses the controller, wherein:
the portable cutting device is configured such that the saw blade cuts into a workpiece which the base is placed on by moving the cutting device main body in a forward direction with respect to the workpiece;
the controller (1) is in front of the rotation shaft in the forward direction, above the base, (2) is oblique to the forward direction with a top end of the controller being rearward of a bottom end of the controller, and (3) has a rectangular parallelepiped shape and a widest surface that is a part of a plane perpendicular to the saw blade:

a rear part of the controller housing is directly connected to a front part of the motor housing such that an upper portion of the controller is housed in the motor housing;

the cutting device further includes a display portion that (1) indicates a state of the electric motor or a state of electric power supplied to the electric motor, (2) is on the widest surface or in an intermediate vicinity of the widest surface and (3) is parallel to the widest surface; and the display portion is on an opposite side of the controller from the rotation shaft.

2. The portable cutting device according to claim 1, further comprising a rechargeable battery that supplies electric power to the electric motor, wherein, the rechargeable battery is disposed close to a rear portion of the electric motor.

3. The portable cutting device according to claim 2, wherein a rear end of the rechargeable battery is disposed in front of a rear end of the base.

4. The portable cutting device according to claim 1, wherein:

the motor housing and the electric motor are disposed such that the rotation shaft of the electric motor(1) extends from within the motor housing and (2) is perpendicular to the saw blade; and the controller housing is tilted at the same angle as the controller.

5. The portable cutting device according to claim 1, wherein the controller is formed integrally with the display portion.

6. The portable cutting device according to claim 1, wherein the electric motor is a brushless motor.

7. A portable cutting device, comprising:

an electric motor including a rotation shaft, a stator and a rotor;

a saw blade that is (1) driven by the electric motor and (2) perpendicular to the rotation shaft;

a controller that controls the electric motor;

a flat rectangular base that supports a cutting device main body of the portable cutting device, the cutting device main body including the electric motor and the controller; and a motor housing that houses the electric motor and a controller housing that houses the controller, wherein:

the portable cutting device is configured such that the saw blade cuts into a workpiece which the base is placed on by moving the cutting device main body in a forward direction with respect to the workpiece; and the controller (1) is in front of the rotation shaft in the forward direction, above the base, (2) is oblique to the forward direction with a top end of the controller being rearward of a bottom end of the controller, and (3) has a rectangular parallelepiped shape and a widest surface that is a part of a plane perpendicular to the saw blade:

a rear part of the controller housing is directly connected to a front part of the motor housing such that an upper portion of the controller is housed in the motor housing;

the cutting device further includes a display portion that (1) indicates a state of the electric motor or a state of electric power supplied to the electric motor, (2) is on the widest surface or in an immediate vicinity of the widest surface and (3) is parallel to the widest surface; and the display portion is on an opposite side of the controller from the rotation shaft.

8. The portable cutting device according to claim 7, wherein the cutting device main body is provided with an upwardly extending grip for a user to hold, spanning greater than half of a length of the base in a front-to-rear direction, forming an uppermost component of the portable cutting device, and having an upward facing D-shaped loop relative to the other components of the cutting device main body.

9. The portable cutting device according to claim 8, further comprising a pullable trigger at a front side of an inner peripheral circumferential surface of the D-shaped loop formed by the grip, the trigger protruding downward and being biased downward by a spring.

10. The portable cutting device according to claim 9, further comprising a lock-off button, located above the trigger on the grip, which is pushable inwards into the grip, wherein if the lock-off button is not pushed, then the trigger cannot be pulled due to a presence of a stopper.

11. The portable cutting device according to claim 10, wherein the lock-off button and the trigger are configured such that when the lock-off button is pushed and the trigger is pulled by a finger of the user, the electric motor starts, wherein when the motor starts, the saw blade is rotated, via a reduction gear adjacent to the rotation shaft, wherein the reduction gear has a tip end which the saw blade is mounted on, further wherein the electric motor only runs for a duration of time when the finger of the user pulls the trigger upwards, wherein if the user lets go, then the motor stops running.

12. The portable cutting device according to claim 7, wherein the controller is housed in the controller housing that is tilted at the same angle as the controller.

13. The portable cutting device according to claim 12, wherein the controller and the housing are collectively tilted at an angle of 30 to 60 degrees relative to the base of the cutting device.

14. The portable cutting device according to claim 7, further comprising a rechargeable battery that supplies electric power to the electric motor, wherein, the rechargeable battery is disposed close to a rear portion of the electric motor.

15. The portable cutting device according to claim 14, wherein a rear end of the rechargeable battery is disposed in front of a rear end of the base.

* * * * *